(12) United States Patent
Fujinaka et al.

(10) Patent No.: US 9,594,229 B2
(45) Date of Patent: Mar. 14, 2017

(54) LENS BARREL

(71) Applicant: Panasonic Intellectual Property Management Co., Ltd., Osaka (JP)

(72) Inventors: Hiroyasu Fujinaka, Osaka (JP); Toshiyuki Nakada, Osaka (JP); Tetsuya Uno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/849,638

(22) Filed: Sep. 10, 2015

(65) Prior Publication Data
US 2016/0077306 A1    Mar. 17, 2016

(30) Foreign Application Priority Data

Sep. 12, 2014  (JP) ................................ 2014-185904
Aug. 6, 2015   (JP) ................................ 2015-155732

(51) Int. Cl.
*G02B 7/10*    (2006.01)

(52) U.S. Cl.
CPC .................................. *G02B 7/102* (2013.01)

(58) Field of Classification Search
CPC ..................................................... G02B 7/102
USPC ......................................................... 359/700
See application file for complete search history.

(56) References Cited

U.S. PATENT DOCUMENTS

| 2009/0052069 | A1* | 2/2009 | Kaneko | G02B 7/102 359/823 |
| 2012/0044579 | A1* | 2/2012 | Tsuji | G02B 7/102 359/700 |
| 2014/0063615 | A1* | 3/2014 | Nomura | G02B 7/04 359/700 |

FOREIGN PATENT DOCUMENTS

| JP | 11-109209 | 4/1999 |
| JP | 2004-125971 | 4/2004 |

* cited by examiner

*Primary Examiner* — James Jones
(74) *Attorney, Agent, or Firm* — Wenderoth, Lind & Ponack, L.L.P.

(57) ABSTRACT

A lens barrel in which a lens can be moved in a direction parallel to an optical axis includes: a first frame having a cam follower and a cam follower base that holds the cam follower; and a second frame that has a cam groove engageable with the cam follower. The first frame and the second frame are moved relatively to each other along the optical axis. The cam follower base has a first end connected to the main body of the first frame via at least one thin portion, and a second end not connected to the main body. The thin portion is formed such that a thickness of the thin portion in a radial direction of the lens barrel is smaller than that of the cam follower base.

8 Claims, 16 Drawing Sheets

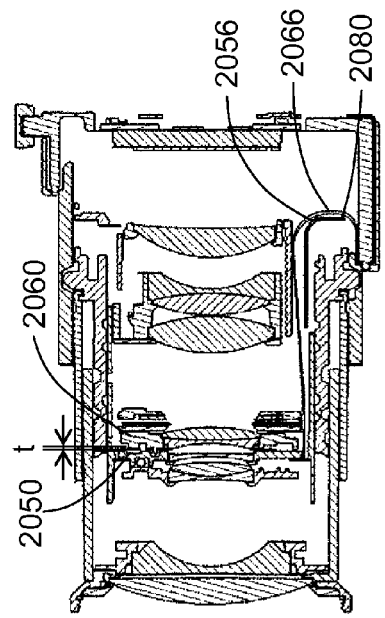
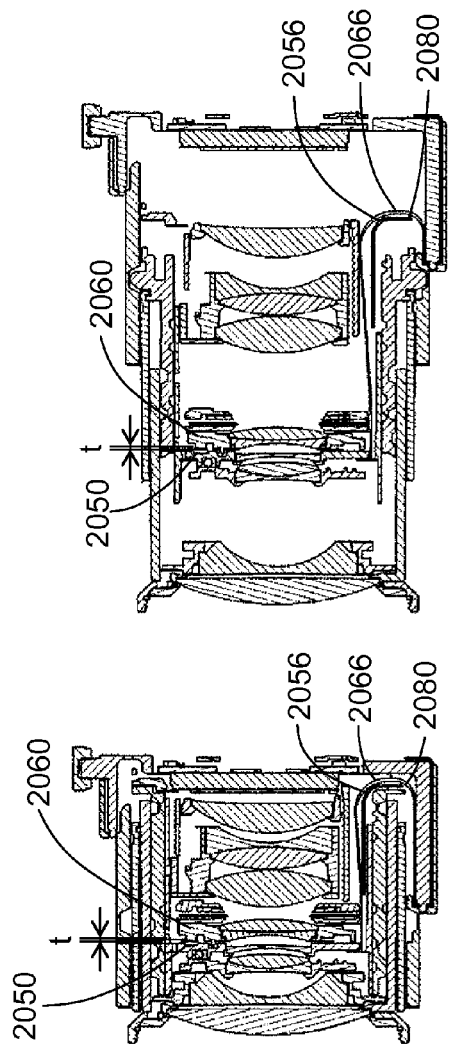
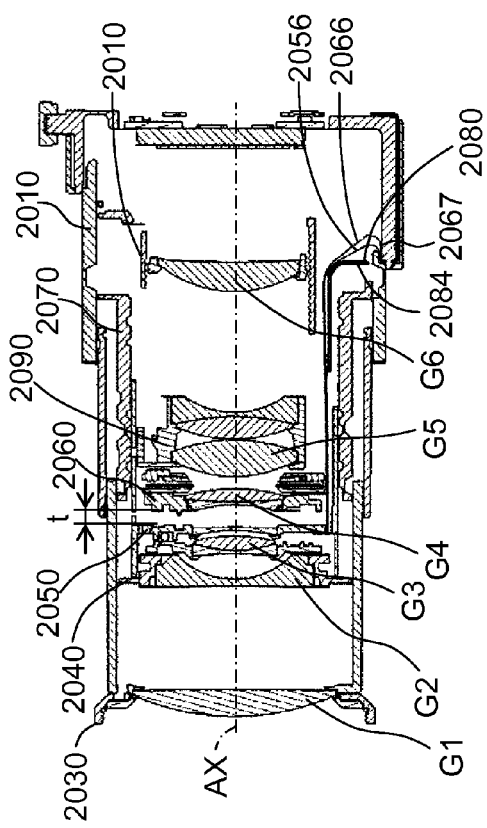
FIG. 12A
FIG. 12B
FIG. 12C

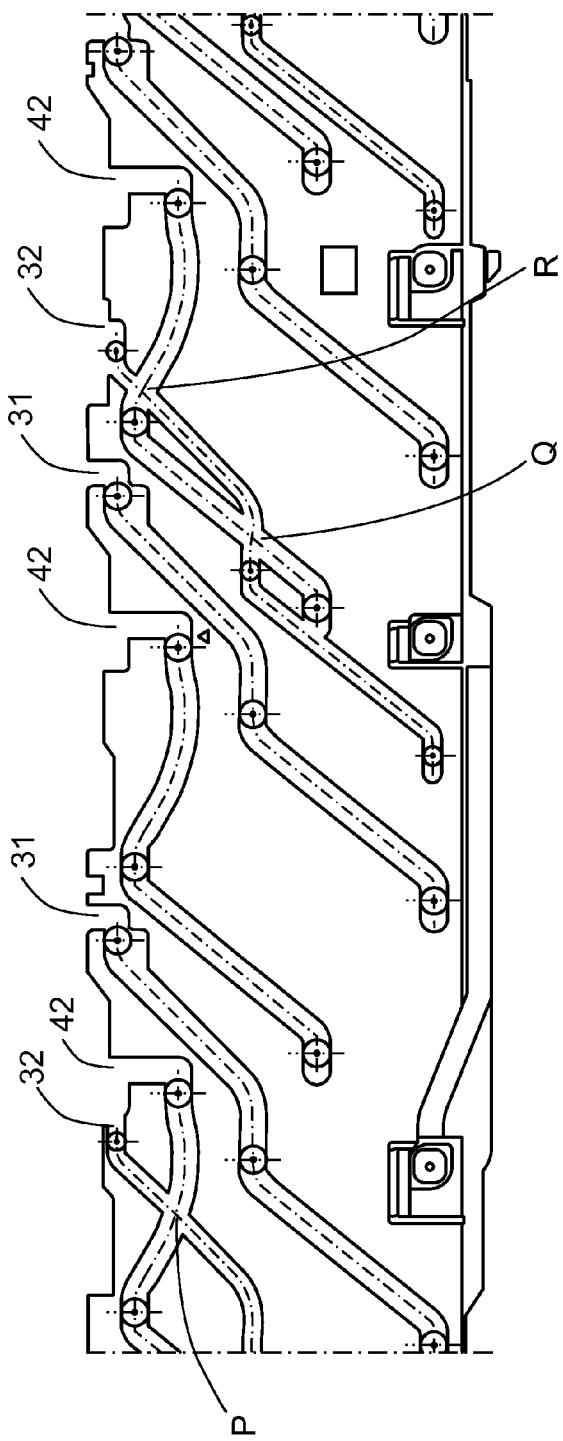
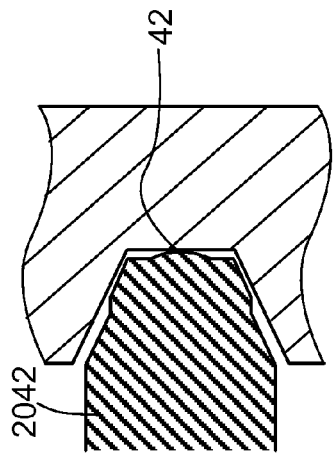
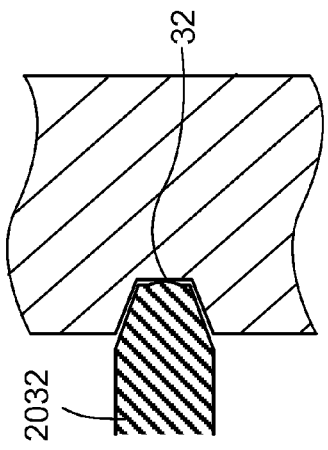
FIG. 14A
FIG. 14B
FIG. 14C

LENS BARREL

BACKGROUND OF THE INVENTION

1. Field

The present disclosure relates to a lens barrel provided with an optical system.

2. Description of Related Art

Unexamined Japanese Patent Publication No. H11-109209 discloses an optical instrument that can be miniaturized by improving a mechanism for biasing the backlash of a cam pin in a cam mechanism for a lens barrel.

The present disclosure provides a lens barrel having a high lens holding accuracy.

SUMMARY

A lens barrel in the present disclosure in which a lens can be moved in a direction parallel to an optical axis includes: a first frame having a cam follower and a cam follower base that holds the cam follower; and a second frame that has a cam groove engageable with the cam follower. The first frame and the second frame are moved relatively to each other along the optical axis. The cam follower base has a first end connected to the main body of the first frame via at least one thin portion, and a second end not connected to the main body. The thin portion is formed such that a thickness of the thin portion in a radial direction of the lens barrel is smaller than that of the cam follower base.

The present disclosure can provide the lens barrel having a high lens holding accuracy.

BRIEF DESCRIPTION OF DRAWINGS

FIG. 12A is a cross-sectional view showing the lens barrel in each of states in the exemplary embodiment;

FIG. 12B is another cross-sectional view showing the lens barrel in each of the states in the exemplary embodiment;

FIG. 12C is a further cross-sectional view showing the lens barrel in each of the states in the exemplary embodiment;

FIG. 14A is a view for explaining a first group main cam groove, a first group auxiliary cam groove, and a second group cam groove in the cam frame in the exemplary embodiment;

FIG. 14B is another view for explaining the first group main cam groove, the first group auxiliary cam groove, and the second group cam groove in the cam frame in the exemplary embodiment;

FIG. 14C is a further view for explaining the first group main cam groove, the first group auxiliary cam groove, and the second group cam groove in the cam frame in the exemplary embodiment;

DETAILED DESCRIPTION

Figure 1:
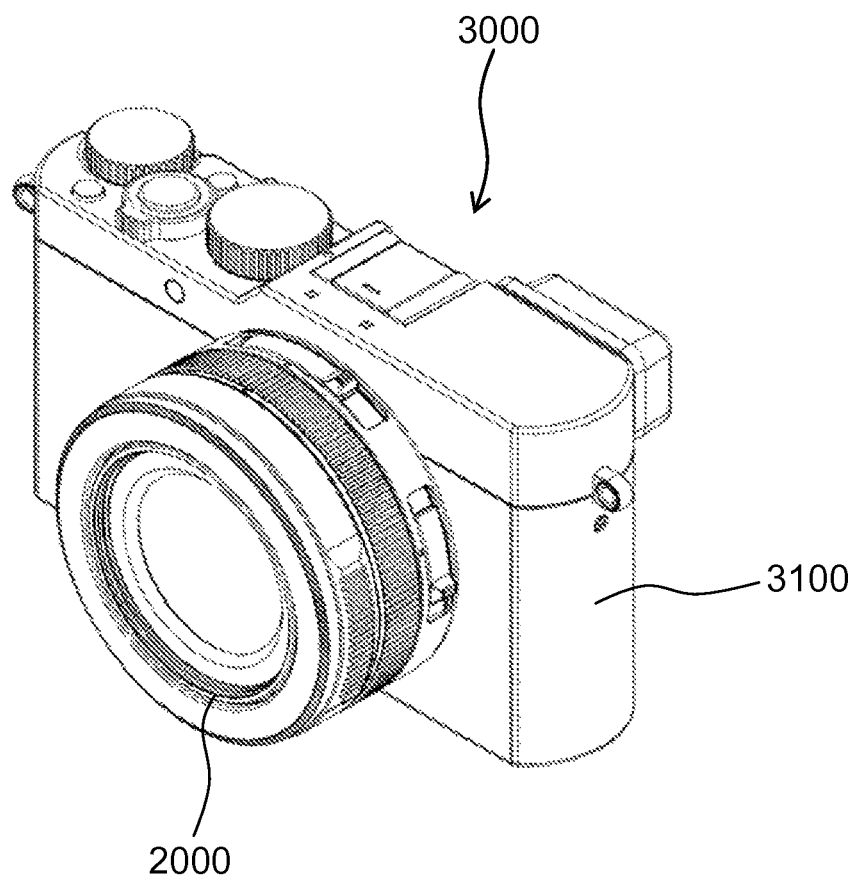
FIG. 1 is a perspective view showing a digital camera in an exemplary embodiment.

An exemplary embodiment will be described below with reference to the drawings, as appropriate. A description may not be given in more detail than necessary. For example, matters that have been already well known may not be described in detail or the description of substantially the same configuration may not be repeated. This is to avoid unnecessary redundancy of the following description and facilitate the understanding of one skilled in the art.

Here, the inventors provide the attached drawings and the following description such that one skilled in the art can sufficiently understand the present disclosure, and therefore, they do not intend to restrict the subject matters of claims.

An exemplary embodiment of the present disclosure will be described with reference to the attached drawings. In the attached drawings, identical or similar constituents are assigned by identical or similar reference numerals. Here, the drawings are merely schematic, and therefore, the ratio of dimensions or the like may be different from the actual ratio. Thus, specific dimensions or the like should be determined in consideration of the following description. It is to be understood that the interrelationships or ratios of mutual dimensions may be different among the drawings.

Incidentally, a digital camera exemplifies an image pickup device in the following exemplary embodiment. In the following description, with reference to a digital camera put at a lateral position, the side of a subject is referred to as "a front side"; the side opposite to a subject (i.e., the side of an image) is referred to as "a back side"; an upper side in a vertical direction is referred to as "an upper side"; a lower side in the vertical direction is referred to as "a lower side"; the right side of a lens barrel, as viewed from the side of the subject, is referred to as "a right side"; and the left side of the lens barrel, as viewed from the side of the subject, is referred to as "a left side". The lateral position is one type of a posture of a digital camera. When an image is picked up at the lateral position, the longitudinal direction of a rectangular landscape image is substantially coincides with a horizontal direction within the image.

[1. General Configuration of Digital Camera]

Figure 2A:
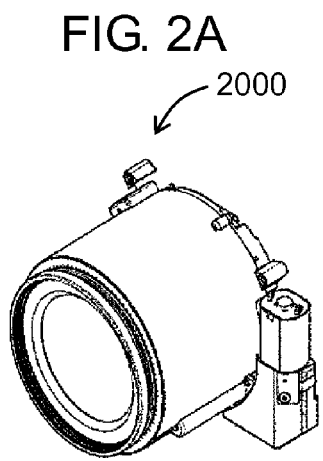
FIG. 2A is a perspective view showing a lens barrel in the exemplary embodiment.
Figure 2B:
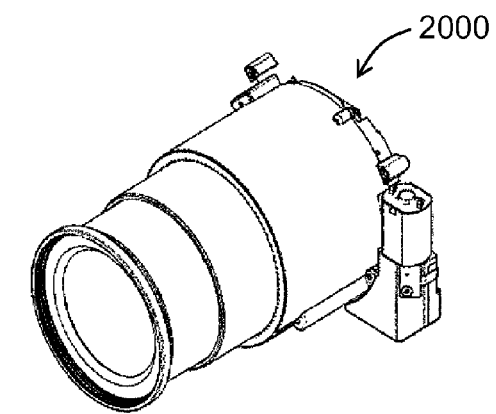
FIG. 2B is another perspective view showing the lens barrel in the exemplary embodiment.
Figure 2C:
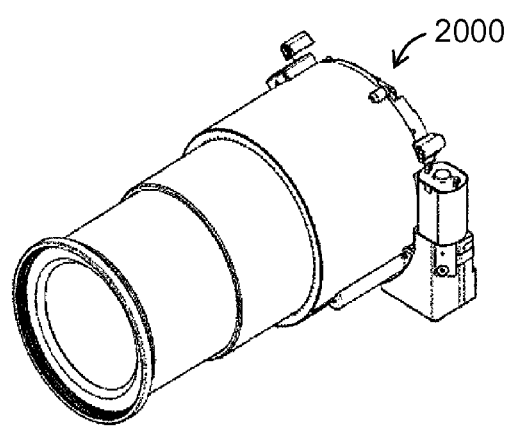
FIG. 2C is a further perspective view showing the lens barrel in the exemplary embodiment.

A description will be given of the configuration of digital camera 3000 with reference to the attached drawings. FIG. 1 is a perspective view showing digital camera 3000. FIGS. 2A to 2C are perspective views showing lens barrel 2000. Here, FIG. 2A shows collapsed lens barrel 2000; FIG. 2B shows lens barrel 2000 while picking up an image (in a wide state); and FIG. 2C shows lens barrel 2000 while picking up an image (in a telephotographic state). In lens barrel 2000 in the present exemplary embodiment, the telephotographic state is the most drawn state.

As shown in FIG. 1, digital camera 3000 is provided with casing 3100 and lens barrel 2000.

Lens barrel 2000 is equipped with a collapsible zoom mechanism. As shown in FIGS. 2A to 2C, lens barrel 2000 has the shortest entire length in the collapsed state whereas it has the longest entire length in the telephotographic state.

[2. Configuration of Lens Barrel]

Figure 3:
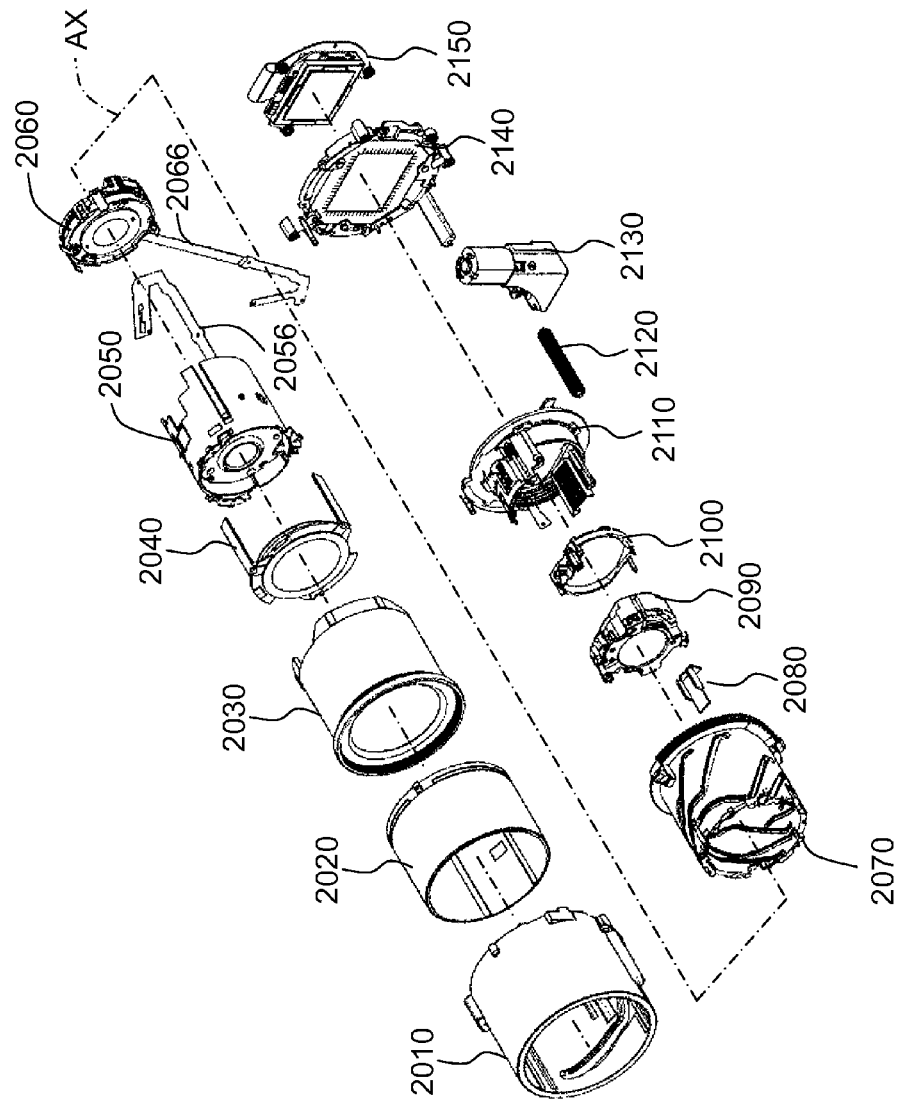
FIG. 3 is an exploded perspective view showing the lens barrel in the exemplary embodiment.

Next, the configuration of lens barrel 2000 will be described with reference to the attached drawings. FIG. 3 is an exploded perspective view showing lens barrel 2000. Here, an alternate long and short dashed line indicates optical axis AX. Since the schematic configuration of the lens barrel will be described in this section and FIG. 3, reference numerals may be omitted in the sentences or the drawings.

In terms of an optical system, lens barrel 2000 includes first lens group G1 to sixth lens group G6 (see FIG. 12C). Here, in the following description, a direction parallel to optical axis AX is referred to as "an optical axis direction"; a direction perpendicular to the optical axis direction is referred to as "a radial direction"; and a direction along a circle centering optical axis AX is referred to as "a circumferential direction". Optical axis AX substantially coincides with the axis of each of frames constituting lens barrel 2000.

As shown in FIG. 3, lens barrel 2000 is provided with fixed frame unit 2010, first group straight frame 2020, first group unit 2030, second group unit 2040, third group unit 2050 (a first frame), fourth group unit 2060 (a third frame), cam frame 2070 (a second frame), FPC guide frame 2080, fifth group unit 2090, sixth group unit 2100, sixth group movement unit 2110, drive gear 2120, zoom motor unit 2130, master flange unit 2140, and image pickup element unit 2150.

Fixed frame unit 2010 is formed into a hollow cylindrical shape. Fixed frame unit 2010 has a rotation restricting groove and a cam groove at the inner circumferential surface thereof. Zoom motor unit 2130 is attached to the outer peripheral surface of fixed frame unit 2010. Zoom motor unit 2130 is a drive source for drawing lens barrel 2000.

Master flange unit 2140 is a plate-like resin member for covering the rear portion of fixed frame unit 2010. Master flange unit 2140 has an opening formed near optical axis AX. A part of image pickup element unit 2150 is inserted into the opening of master flange unit 2140.

First group straight frame 2020 is formed into a hollow cylindrical shape, and is disposed inside fixed frame unit 2010. First group straight frame 2020 has a rotation restricting projection at the outer peripheral surface thereof and a rotation restricting groove at the inner circumferential surface thereof. The rotation restricting projection engages with the rotation restricting groove formed at fixed frame unit 2010. As a consequence, first group straight frame 2020 is held in such a manner as not to be rotatable relatively with respect to fixed frame unit 2010 whereas in such a manner as to be movable lengthwise in the optical axis direction. The rotation restricting groove is formed at the inner circumferential surface of first group straight frame 2020 in the optical axis direction.

First group unit 2030 holds therein first lens group G1 for taking in light into lens barrel 2000 (see FIG. 12C). First group unit 2030 is formed into a cylindrical shape, and is disposed inside first group straight frame 2020. First group unit 2030 has rotation restricting projections at the outer peripheral surface thereof and rotation restricting grooves and a cam follower at the inner circumferential surface thereof. The rotation restricting projection engages with the rotation restriction groove formed at first group straight frame 2020. As a consequence, first group unit 2030 is held in such a manner as not to be rotatable relatively with respect to first group straight frame 2020 whereas in such a manner as to be movable lengthwise in the optical axis direction. The rotation restricting groove of first group unit 2030 is formed at the inner circumferential surface of first group unit 2030 in the optical axis direction.

Second group unit 2040 holds second lens group G2 therein (see FIG. 12C). Second lens group G2 is used in zooming for changing the angle of an image of a subject. Second group unit 2040 is formed into a disk-like shape, and is disposed inside first group unit 2030. Second group unit 2040 has rotation restrictor 2041 extending from the outer peripheral surface rearward in the optical axis direction and cam follower 2042 projecting from the vicinity of the rear end of rotation restrictor 2041 inward of the inner circumferential surface (see FIG. 13). Rotation restrictor 2041 engages with the rotation restricting groove formed at first group unit 2030. In this manner, second group unit 2040 is held in such a manner as not to be rotatable relatively with respect to first group unit 2030 whereas in such a manner as to be movable lengthwise in the optical axis direction.

Third group unit 2050 holds third lens group G3 (see FIG. 12C). Third lens group G3 is used in zooming for changing the angle of an image of a subject or correcting image blurring caused by camera shake of a user. Third group unit 2050 is formed into a cylindrical shape, and is disposed inside cam frame 2070. Third group unit 2050 has a cam follower, a rotation restricting projection, and a rotation restricting slit. The rotation restricting projection of third group unit 2050 is erected near a fore end at the outer peripheral surface thereof. The rotation restricting projection engages with the rotation restricting groove formed at the inner circumferential surface of first group unit 2030. In this manner, third group unit 2050 is held in such a manner as not to be rotatable relatively with respect to first group unit 2030 whereas in such a manner as to be movable lengthwise in the optical axis direction.

Fourth group unit 2060 holds fourth lens group G4 (see FIG. 12C). Fourth group unit G4 is used in zooming for changing the angle of an image of a subject. Fourth group unit 2060 is formed into a disk-like shape, and is disposed inside third group unit 2050. Fourth group unit 2060 has a rotation restrictor projecting outward in the radial direction and a cam follower projecting from the rotation restrictor further outward in the radial direction. The rotation restrictor engages with the rotation restricting slit formed at third group unit 2050. As a consequence, fourth group unit 2060 is held in such a manner as not to be rotatable relatively with respect to third group unit 2050 whereas in such a manner as to be movable lengthwise in the optical axis direction. Shutter unit 2065 for controlling the intensity of light reaching an image pickup element constitutes the rear side of fourth group unit 2060 in the optical axis direction.

Fifth group unit 2090 holds fifth lens group G5 (see FIG. 12C). Fifth lens group G5 is used in zooming for changing the angle of an image of a subject. Fifth group unit 2090 is formed into a disk-like shape, and is disposed inside third group unit 2050. Fifth group unit 2090 has a rotation restrictor projecting outward in the radial direction and a cam follower projecting from the rotation restrictor further outward in the radial direction. The rotation restrictor engages with the rotation restricting slit formed at the third group unit. As a consequence, fifth group unit 2090 is held in such a manner as not to be rotatable relatively with respect to third group unit 2050 whereas in such a manner as to be movable lengthwise in the optical axis direction.

Sixth group unit 2100 holds sixth lens group G6 (see FIG. 12C). Sixth lens group G6 is used in focusing for adjusting the focal state of an image of a subject.

Sixth group movement unit 2110 is formed into a cylindrical shape, and holds sixth group unit 2100 therein. Sixth group movement unit 2110 has a flange near a rear end at the outer peripheral surface, and further, has a rotation restricting projection projecting from the flange further outward in the radial direction. The rotation restricting projection engages with the rotation restricting groove formed at the inner circumferential surface of fixed frame unit 2010. Sixth group movement unit 2110 is held in such a manner as not to be rotatable relatively with respect to fixed frame unit 2010 whereas in such a manner as to be movable lengthwise in the optical axis direction. A focus motor is attached to sixth group movement unit 2110. Thus, the drive of the motor enables sixth group movement unit 2110 and sixth group unit 2100 to be positionally adjusted relative to each other in the optical axis direction. Sixth group movement unit 2110 has a cam follower projecting outward in the radial direction near a front end at the outer peripheral surface thereof.

Cam frame 2070 is formed into a cylindrical shape, and is disposed inside first group unit 2030. Cam frame 2070 has a plurality of cam grooves at the inner circumferential surface and the outer peripheral surface, and further, has a cam follower and a driven gear near a rear end at the outer peripheral surface. The cam follower engages with the cam groove formed at the inner circumferential surface of fixed frame unit 2010. Drive force is transmitted to the driven gear from zoom motor unit 2130 via drive gear 2120. When zoom motor unit 2130 is energized so as to apply the drive force, cam frame 2070 is moved lengthwise in the optical axis direction while being rotated on optical axis AX with respect to fixed frame unit 2010.

The respective cam followers of first group unit 2030 and second group unit 2040 engage with the cam grooves formed at the outer peripheral surface of cam frame 2070. In contrast, the respective cam followers of third group unit 2050, fourth group unit 2060, fifth group unit 2090, and the sixth group movement unit engage with the cam grooves formed at the inner circumferential surface of cam frame 2070. Here, when zoom motor unit 2130 is energized so as to apply the drive force, first group unit 2030, second group unit 2040, third group unit 2050, fourth group unit 2060, fifth group unit 2090, and sixth group movement unit 2110 are not rotated relatively with respect to fixed frame unit 2010 but are moved lengthwise in the optical axis direction.

With the above-described configuration, when zoom motor unit 2130 and the focus motor are driven in lens barrel 2000, first lens group G1 to sixth lens group G6 are disposed at their proper positions so as to zoom and focus an image.

[3. Detailed Configuration of Members Constituting Lens Barrel]

In [2. Configuration of lens barrel], the description has given of the outline of each of the members constituting lens barrel 2000. Hereinafter, a description will be given of the details of each of component parts constituting lens barrel 2000.

[3-1. Third Group Unit]

The configuration of third group unit 2050 will be explained in more detail with reference to FIGS. 4A to 4E.

Figure 4A:
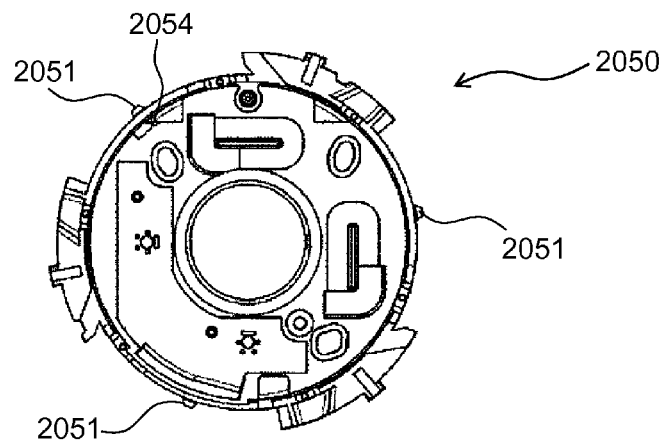
FIG. 4A is a constitutional view showing essential parts of a third group unit of the lens barrel in the exemplary embodiment.
Figure 4B:
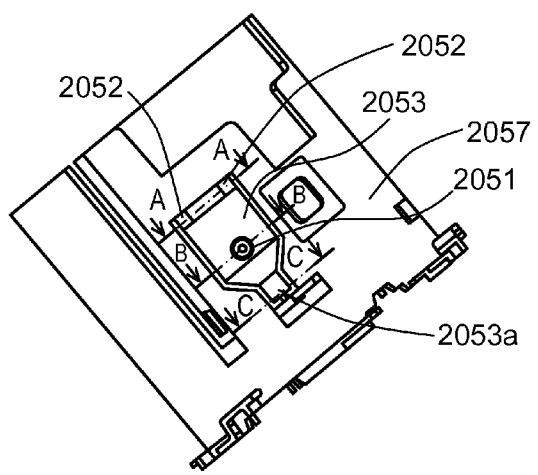
FIG. 4B is another constitutional view showing the essential parts of the third group unit of the lens barrel in the exemplary embodiment.
Figure 4C:
FIG. 4C is a further constitutional view showing the essential parts of the third group unit of the lens barrel in the exemplary embodiment.
Figure 4D:
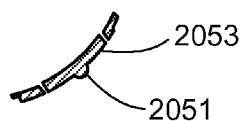
FIG. 4D is a still further constitutional view showing the essential parts of the third group unit of the lens barrel in the exemplary embodiment.
Figure 4E:
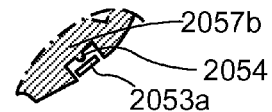
FIG. 4E is a still further constitutional view showing the essential parts of the third group unit of the lens barrel in the exemplary embodiment.

FIGS. 4A to 4E are constitutional views showing essential parts of third group unit 2050. FIG. 4A is a view showing third group unit 2050, as viewed from the front in the optical axis direction. FIG. 4B is a view showing third group unit 2050, as viewed from the outside in the radial direction. FIG. 4C is a cross-sectional view taken along a line A-A of FIG. 4B. FIG. 4D is a cross-sectional view taken along a line B-B of FIG. 4B. FIG. 4E is a cross-sectional view taken along a line C-C of FIG. 4B.

As shown in FIG. 4A, third group unit 2050 is formed into a cylindrical shape and has three cam followers 2051 projecting from the outer peripheral surface. As shown in FIG. 4B, only one of three cam followers 2051 is held by cam follower base 2053. Cam follower base 2053 is separated from main body 2057 of third group unit 2050, and is coupled to main body 2057 of third group unit 2050 via two thin portions 2052.

As shown in FIG. 4C, the radial thickness of thin portion 2052 is less than the radial thickness of thin portion surrounding portion 2057a at main body 2057 of third group unit 2050. Moreover, as shown in FIGS. 4C and 4D, the radial thickness of thin portion 2052 is less than the radial thickness of cam follower base 2053. Furthermore, the length of thin portion 2052 in the optical axis direction is less than the length of cam follower base 2053. With this shape, cam follower base 2053 can be oscillated on a fulcrum near thin portion 2052, and thus, is easily displaced in the radial direction.

In addition, thin portions 2052 are disposed apart from each other. More specifically, two thin portions 2052 are disposed at two positions separated from each other in the circumferential direction. Therefore, in comparison with the case where cam follower base 2053 and main body 2057 are coupled to each other via thin portion 2052 disposed at one position, thin portion 2052 is hardly twisted while cam follower base 2053 is displaced. As a consequence, cam follower 2051 held by cam follower base 2053 is easily displaced in the radial direction whereas it is hardly displaced in either the circumferential direction or the optical axis direction. In other words, in the case where thin portions 2052 are disposed apart from each other (i.e., thin portions 2052 are disposed at a plurality of positions), cam follower base 2053 is oscillated on a plurality of fulcrums. In this manner, in comparison with the case where only one thin portion 2052 is disposed and cam follower base 2053 is oscillated on only one fulcrum, thin portion 2052 is hardly twisted. This is because the plurality of fulcrums mutually restrict any twist. Furthermore, this is because greater force is needed for twisting thin portion 2052 in the circumferential direction or the optical axis direction in the case where thin portions 2052 are disposed apart from each other in comparison with the case where thin portion 2052 is disposed at only one position.

Additionally, as shown in FIG. 4E, in cam follower base 2053, front end 2053a opposite to thin portion 2052 in the optical axis direction faces base facing portion 2057b serving as a part of main body 2057. Base facing portion 2057b is located inward in the radial direction of cam follower base 2053. A radial clearance is defined between front end 2053a of cam follower base 2053 and base facing portion 2057b of main body 2057. Moreover, base facing portion 2057b of main body 2057 has restricting projection 2054 at a position at which base facing portion 2057b of main body 2057 faces front end 2053a of cam follower base 2053 and at a position opposite to cam follower 2051 with cam follower base 2053 being held between the restricting projection and the cam follower. This configuration partly reduces the clearance defined between cam follower base 2053 and main body 2057.

Third group unit 2050 is formed in the above-described manner, thus restricting a displacement when cam follower base 2053 is displaced inward in the radial direction. That is to say, when cam follower base 2053 is displaced more than a predetermined quantity inward in the radial direction, front end 2053a of cam follower base 2053 abuts against restricting projection 2054 so that cam follower base 2053 cannot be further displaced. The restriction of the displacement of cam follower base 2053 can suppress slippage of cam follower 2051 from the cam groove in the case where external force such as a drop impact is exerted on the barrel, thus enhancing the reliability of lens barrel 2000.

[3-2. Fourth Group Unit]

Next, the configuration of fourth group unit 2060 will be explained in detail with reference to FIG. 5.

Figure 5:
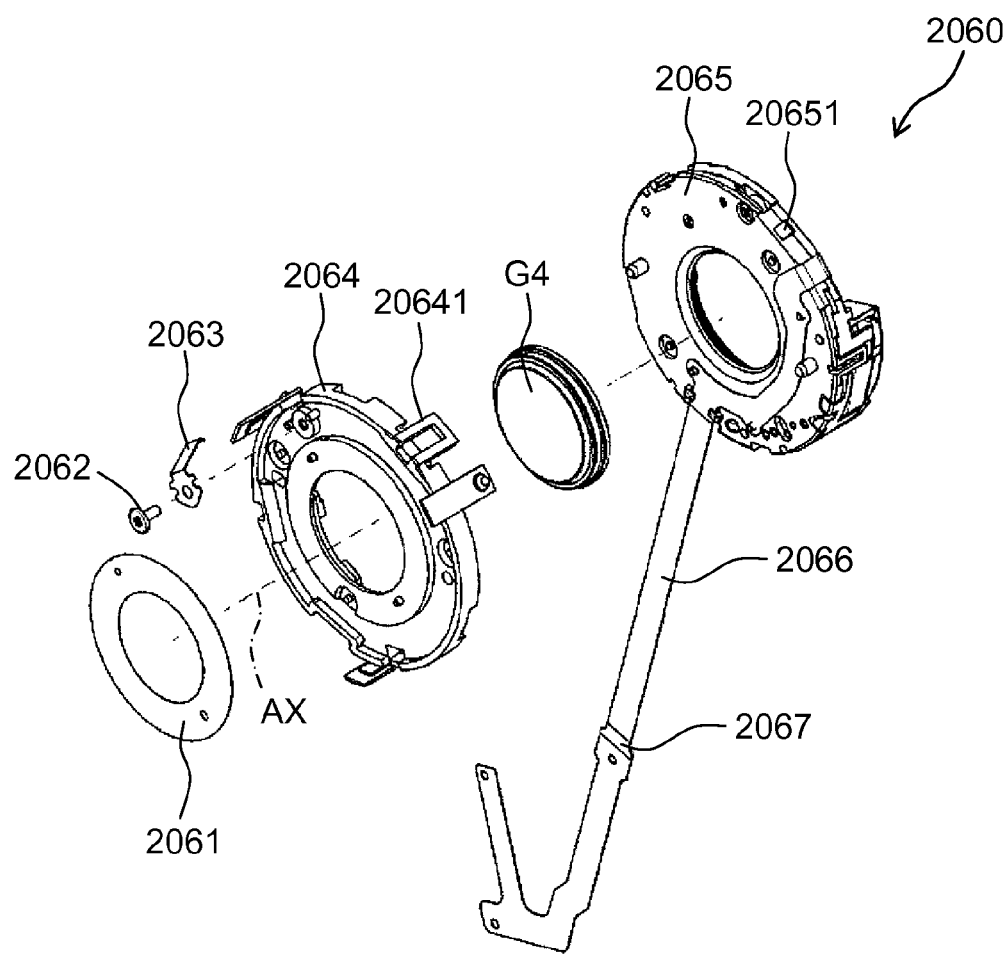
FIG. 5 is an exploded perspective view showing a fourth group unit of the lens barrel in the exemplary embodiment.

FIG. 5 is an exploded perspective view showing fourth group unit 2060. As shown in FIG. 5, fourth group unit 2060 has light sheet 2061, screw 2062, leaf spring 2063 (i.e., an urging member), fourth group frame 2064, and shutter unit 2065, and thus, holds fourth lens group G4.

Leaf spring 2063 is held by fourth group frame 2064 via screw 2062. Leaf spring 2063 is disposed at a position facing cam follower base 2053.

Light sheet 2061 for preventing an unnecessary light beam from intruding into fourth lens group G4 is disposed forward of fourth group frame 2064 in the optical axis direction.

Fourth lens group G4 is bonded to fourth group frame 2064, and hook 20651 is then inserted into hook holder 20641 formed at fourth group frame 2064 so that shutter unit 2065 is integrated with fourth group frame 2064.

[3-3. Third Group Unit+Fourth Group Unit+Cam Frame]

Next, a description will be given of a configuration in which third group unit 2050, fourth group unit 2060, and cam frame 2070 are combined with each other with reference to FIGS. 6A, 6B, 7A, 7B, 8A, and 8B.

Figure 6A:
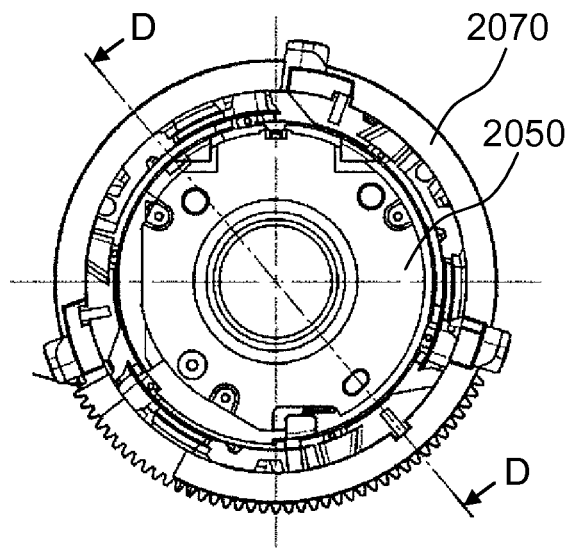
FIG. 6A is a constitutional view showing essential parts of the lens barrel in the exemplary embodiment.
Figure 6B:
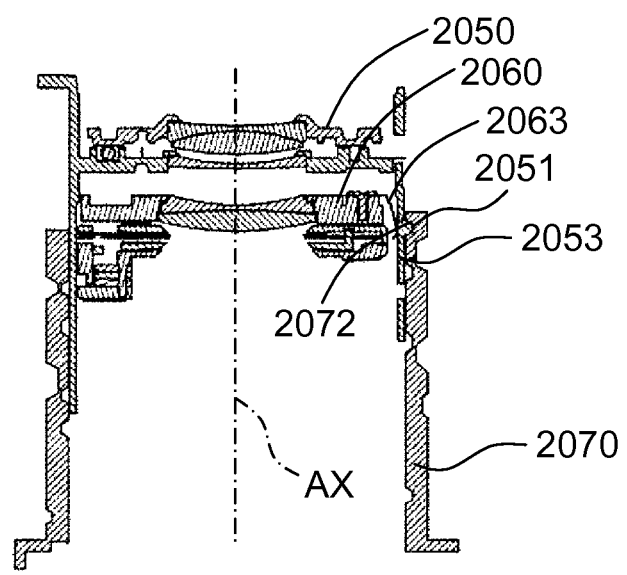
FIG. 6B is another constitutional view showing the essential parts of the lens barrel in the exemplary embodiment.

FIGS. 6A and 6B are constitutional views showing essential parts of lens barrel 2000. FIG. 6A is a view showing the combination of third group unit 2050, fourth group unit 2060, and cam frame 2070, as viewed from the front in the optical axis direction. FIG. 6B is a cross-sectional view taken along a line D-D of FIG. 6A.

As shown in FIG. 6B, leaf spring 2063 fixed to fourth group unit 2060 urges cam follower base 2053 from the inside outward in the radial direction. Thus, cam follower 2051 is urged toward cam groove 2072. With this configuration, fourth group unit 2060 is urged toward cam frame 2070 via third group unit 2050 in one direction of the radial direction.

Moreover, when cam follower base 2053 is displaced outward in the radial direction, cam follower 2051 is pressed against cam groove 2072 formed at cam frame 2070 in third group unit 2050. Additionally, cam follower base 2053 is urged in one direction of the radial direction, and furthermore, cam follower 2051 is inserted into a tapered portion of cam groove 2072.

Consequently, the backlash of each of third group unit 2050, fourth group unit 2060, and cam frame 2070 is restricted in the optical axis direction. With this configuration, in lens barrel 2000, two of third group unit 2050 and fourth group unit 2060 can be held by cam frame 2070 in a state in which only one leaf spring 2063 urges two of third group unit 2050 and fourth group unit 2060 toward cam frame 2070. Thus, lens barrel 2000 can hold third lens group G3 and fourth lens group G4 with high accuracy. Consequently, this configuration of lens barrel 2000 can enhance the relatively positional accuracy between third lens group G3 and fourth lens group G4.

Figure 7A:
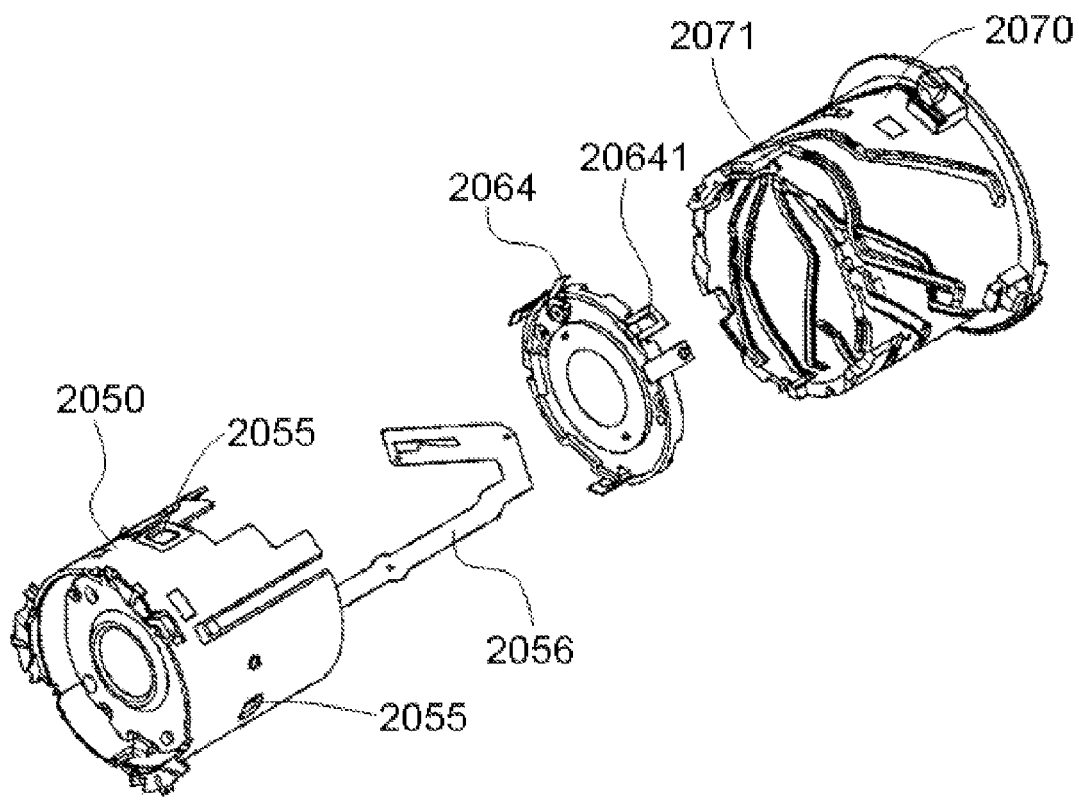
FIG. 7A is an exploded perspective view showing the third group unit, the fourth group unit, and a cam frame of the lens barrel in the exemplary embodiment.
Figure 7B:
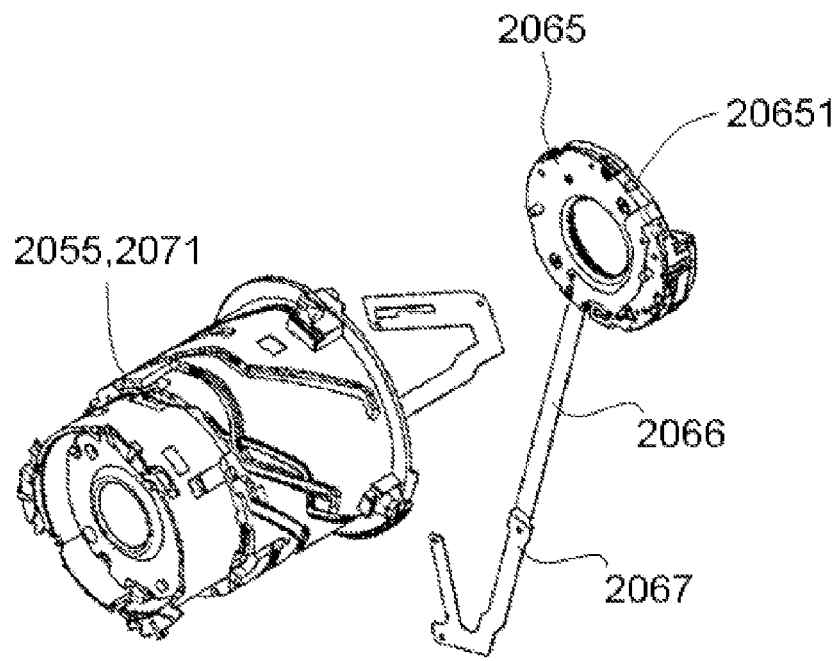
FIG. 7B is another exploded perspective view showing the third group unit, the fourth group unit, and the cam frame of the lens barrel in the exemplary embodiment.

FIGS. 7A and 7B are exploded perspective views showing third group unit 2050, fourth group unit 2060, and cam frame 2070 of lens barrel 2000. FIG. 7A is an exploded perspective view showing third group unit 2050, fourth group frame 2064, and cam frame 2070. FIG. 7B is an exploded perspective view showing shutter unit 2065 that is inserted from the rear side in the optical axis direction in FIG. 7A.

In FIG. 7A, three aligning holes 2055 are formed at the outer peripheral surface of third group unit 2050 (only two are shown in FIG. 7A). Cutaway portion 2071 is formed on the circumference of cam frame 2070 at the front side in the optical axis direction. Shutter unit 2065 of fourth group unit 2060 is inserted into third group unit 2050 from the rear side of third group unit 2050, and then, shutter unit 2065 is integrated with fourth group frame 2064 owing to the above-described engagement between hook 20651 and hook holder 20641. Third group unit 2050 is movably held with respect to cam frame 2070 in the optical axis direction. When third group unit 2050 is moved up to the most drawn position with respect to cam frame 2070, aligning hole 2055 and cutaway portion 2071 face each other so as to form one through hole, as shown in FIG. 7B.

Figure 8A:
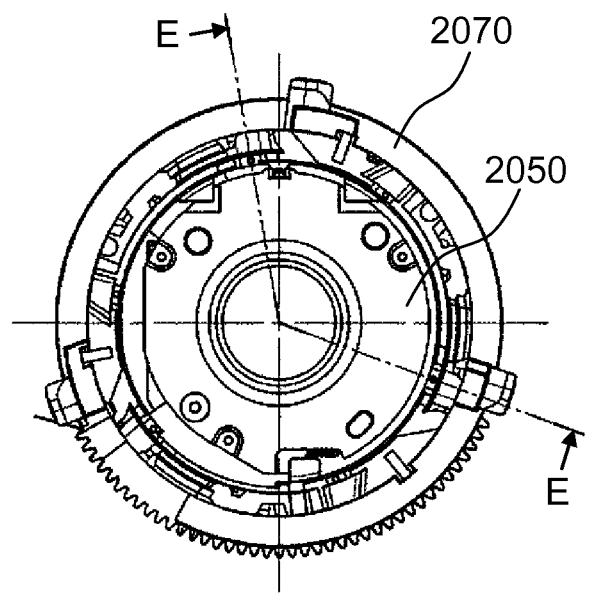
FIG. 8A is a constitutional view showing essential parts of the third group unit, the fourth group unit, and the cam frame of the lens barrel in the exemplary embodiment.
Figure 8B:
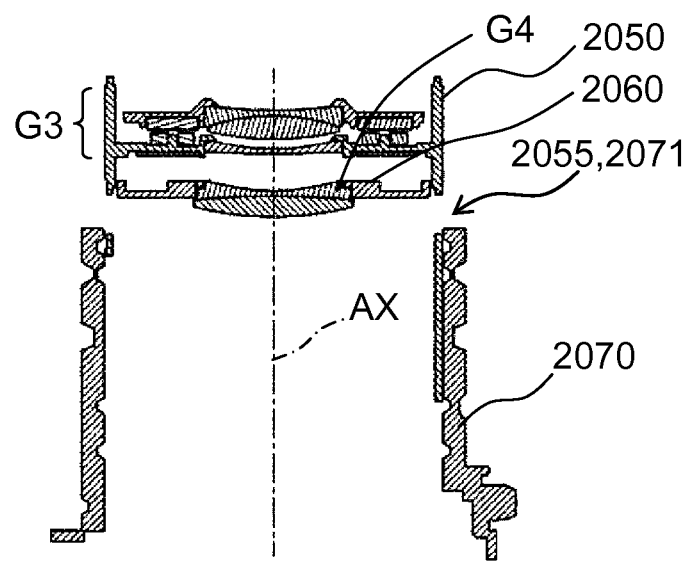
FIG. 8B is another constitutional view showing the essential parts of the third group unit, the fourth group unit, and the cam frame of the lens barrel in the exemplary embodiment.

FIGS. 8A and 8B are constitutional views showing essential parts of third group unit 2050, fourth group unit 2060, and cam frame 2070 of lens barrel 2000. FIG. 8A is a front view showing a state in which third group unit 2050, fourth group unit 2060, and cam frame 2070 are combined (before the shutter unit is inserted). FIG. 8B is a cross-sectional view taken along a line E-E of FIG. 8A in the state in which third group unit 2050, fourth group unit 2060, and cam frame 2070 are combined (before the shutter unit is inserted).

As shown in FIGS. 8A and 8B, a jig is inserted through aligning hole 2055 formed at third group unit 2050, and then, the position of fourth lens group G4 is adjusted with respect to third lens group G3 while fourth lens group G4 can be bonded to fourth group frame 2064. Consequently, lens barrel 2000 can enhance the relatively positional accuracy of third lens group G3 and fourth lens group G4 in the state in which third group unit 2050, fourth group unit 2060, and cam frame 2070 are assembled.

Lens barrel 2000 in the present exemplary embodiment is configured such that aligning hole 2055 and cutaway portion 2071 face each other when third group unit 2050 is most drawn with respect to cam frame 2070. With this configuration, the through hole can be formed when fourth lens group G4 is aligned, whereas no through hole is formed at a zoom position during other image pickup, thus preventing any leakage of light.

In this manner, lens barrel 2000 can enhance the relatively positional accuracy of third lens group G3 and fourth lens group G4 so as to improve its own resolution performance. Alternatively, since allowance for the accuracy of the adjustment between third lens group G3 and fourth lens group G4 can be given to miniaturization of a lens, lens barrel 2000 can be reduced in size and weight.

Incidentally, although an urging member has been exemplified by the configuration in which leaf spring 2063 is fixed to fourth group unit 2060 in the present exemplary embodiment, it is to be understood that a leaf spring may be disposed in third group unit 2050 or urging means such as a coil spring other than the leaf spring may be used. Alternatively, third group unit 2050 may be made of metallic material so that the resiliency of thin portion 2052 achieves direct urging.

[4. Detailed Configuration of Flexible Circuit Wiring Portion]

[4-1. FPC Guide Frame]

Hereinafter, a description will be given of how to wire, inside the barrel, flexible circuits (OIS flexible circuit 2056 and shutter flexible circuit 2066) for connecting a shake correction unit and shutter unit 2065 incorporated in leans barrel 2000 to a main circuit with reference to FIGS. 9, 10A to 10C, 11, and 12A to 12C.

Figure 9:
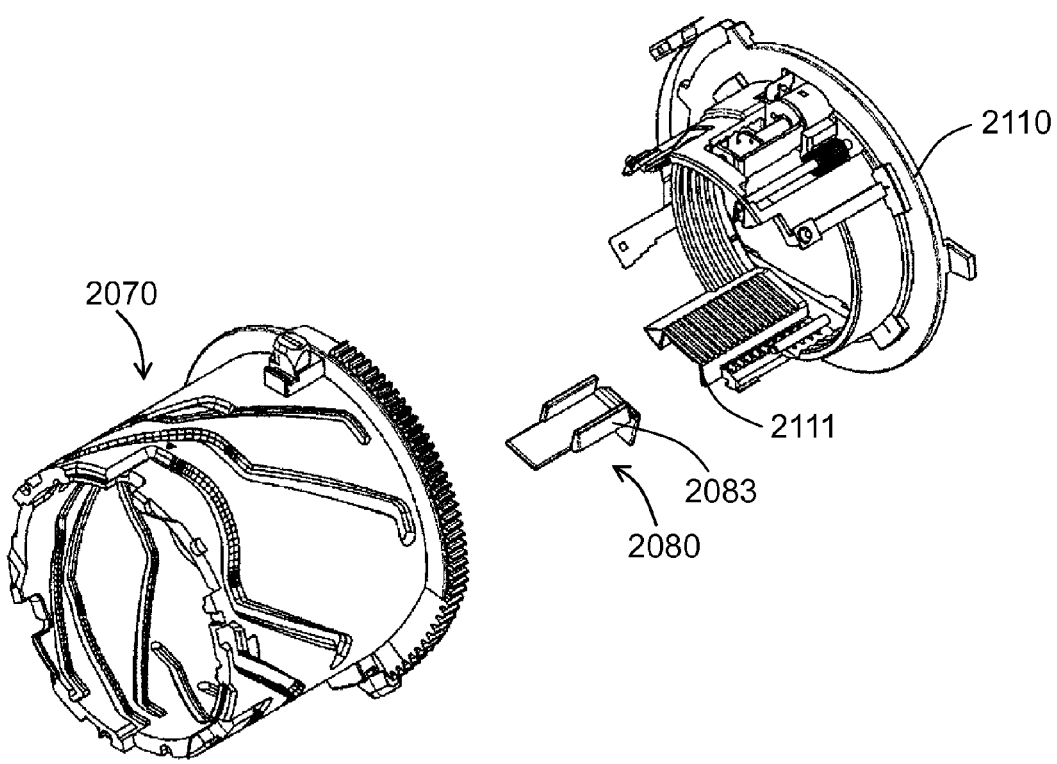
FIG. 9 is an exploded perspective view showing the attachment state of an FPC (abbreviating flexible printed circuit) guide frame in the exemplary embodiment.
Figure 10A:
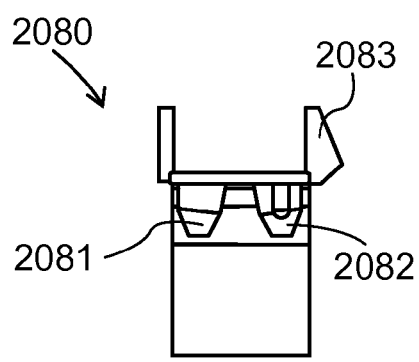
FIG. 10A is a three-view drawing of the FPC guide frame in the exemplary embodiment.
Figure 10B:
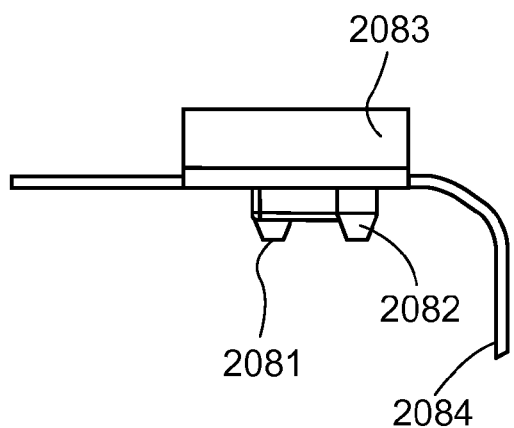
FIG. 10B is another three-view drawing of the FPC guide frame in the exemplary embodiment.
Figure 10C:
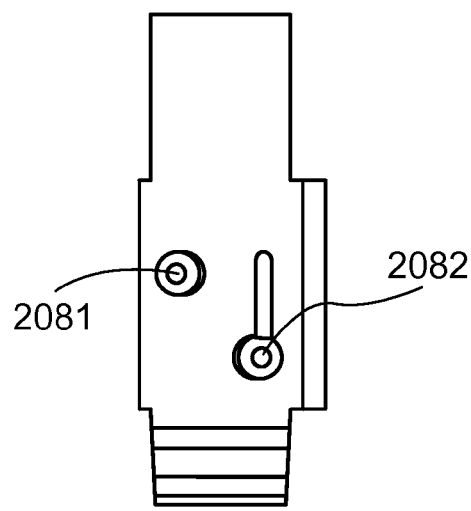
FIG. 10C is a further three-view drawing of the FPC guide frame in the exemplary embodiment.
Figure 11:
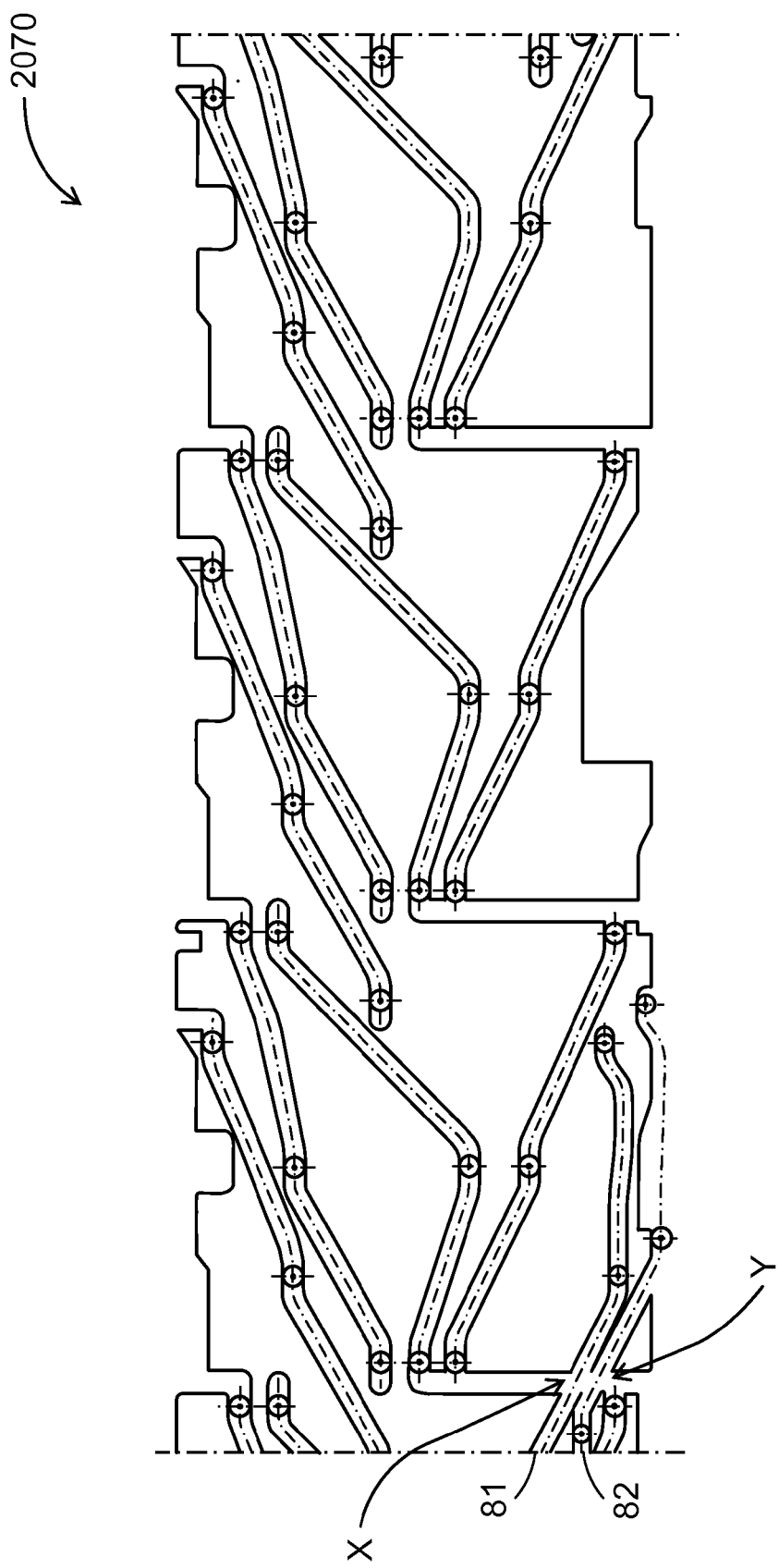
FIG. 11 is a developed view showing the inner circumferential surface of the cam frame in the exemplary embodiment.

FIG. 9 is an exploded perspective view showing the attachment state of FPC guide frame 2080; FIGS. 10A to 10C are three-view drawings of FPC guide frame 2080; and FIG. 11 is a developed view showing the inner surface of cam frame 2070.

In FIG. 9, FPC guide frame 2080 is disposed inside cam frame 2070 and outside sixth group movement unit 2110. FPC guide frame 2080 can be moved in the optical axis direction independently of cam frame 2070 and sixth group movement unit 2110. Sixth group movement unit 2110 is provided with guide wall 2111 for guiding the movement of FPC guide frame 2080 in the optical axis direction. Straight guide projection 2083 slides inside guide wall 2111, so that FPC guide frame 2080 is moved in the optical axis direction.

FIG. 10A is a view showing FPC guide frame 2080, as viewed from the front side in the optical axis direction; FIG. 10B is a view showing FPC guide frame 2080, as viewed in the horizontal direction perpendicular to optical axis AX; and FIG. 10C is a view showing FPC guide frame 2080, as viewed in the vertical direction perpendicular to optical axis AX. As shown in FIGS. 10A to 10C, FPC guide frame 2080 has straight guide projection 2083 and cam follower a 2081, and cam follower b 2082. As shown in FIG. 10B, FPC guide frame 2080 is formed into an L shape, as viewed in the horizontal direction perpendicular to optical axis AX.

Straight guide projection 2083 is slidably disposed on the guide wall 2111 of sixth group movement unit 2110, and further, is held with respect to sixth group movement unit 2110 in a movable manner in the optical axis direction. Moreover, cam follower a 2081 and cam follower b 2082 engage with cam groove 81 and cam groove 82 formed at the inner circumferential surface of cam frame 2070, respectively.

In FIG. 11, cam groove 81 is split via another cam groove at section X. Moreover, cam groove 82 is split via another cam groove at section Y, and furthermore, projects from cam frame 2070 at its rear end.

However, cam follower a 2081 and cam follower b 2082 are disposed at positions at which the heights in the optical axis direction and the phases in the circumferential direction are different, so that at least one of cam follower a 2081 and cam follower b 2082 engages with cam groove 81 or cam groove 82 all the time, thereby achieving continuous driving.

Specifically, when cam follower a 2081 exists in section X of cam groove 81, cam follower b 2082 slides inside cam groove 82, thereby suppressing the slippage of FPC guide frame 2080 from cam frame 2070. In contrast, when cam follower b 2082 exists in section Y of cam groove 82, cam follower a 2081 slides inside cam groove 81, thereby suppressing the slippage of FPC guide frame 2080 from cam frame 2070.

In this manner, FPC guide frame 2080 can be moved lengthwise in the optical axis direction independently of other units according to the rotation of cam frame 2070.

FIGS. 12A to 12C are cross-sectional views showing lens barrel 2000 in each of states.

FIG. 12A is a cross-sectional view showing lens barrel 2000 in a collapsed state. FIG. 12B is a cross-sectional view showing lens barrel 2000 in a wide (widest angle) state. FIG. 12C is a cross-sectional view showing lens barrel 2000 in a telephotographic (most telescopic) state.

As shown in FIGS. 12A to 12C, OIS flexible circuit 2056 and shutter flexible circuit 2066 are guided along L-shaped FPC guide frame 2080 in each of the states of lens barrel 2000, to be connected to contacts at the ends of the barrel. In the collapsed state shown in FIG. 12A, piece 2084 that is formed at FPC guide frame 2080 perpendicularly to optical axis AX abuts against the rear end of cam frame 2070. In the wide state shown in FIG. 12B and the telephotographic state shown in FIG. 12C, piece 2084 that is formed at FPC guide frame 2080 perpendicularly to optical axis AX is moved from the rear end of cam frame 2070 rearward in the optical axis direction.

In FIGS. 12A to 12C, FPC guide frame 2080 is moved lengthwise in the optical axis direction, so that the sag of OIS flexible circuit 2056 is seldom varied in any states of lens barrel 2000. With this configuration, FPC guide frame 2080 can restrain sagged OIS flexible circuit 2056 from being hooked on other portions or being held between other frames.

In this manner, the proper setting of cam groove 81 and cam groove 82 at cam frame 2070 enables the control of the sag of OIS flexible circuit 2056.

On the other hand, the situation of shutter flexible circuit 2066 is different from that of OIS flexible circuit 2056.

In FIGS. 12A to 12C, shutter flexible circuit 2066 is located at the same position as OIS flexible circuit 2056, and thus, is pulled outside lens barrel 2000.

When clearance t between third group unit 2050 and fourth group unit 2060 is not varied even if the barrel is drawn, no problem arises because the sag is constant. However, in the present exemplary embodiment, clearance t between third group unit 2050 and fourth group unit 2060 is varied according to zooming.

In the present exemplary embodiment, although clearance t between third group unit 2050 and fourth group unit 2060 is not varied in the collapsed state and the wide state, clearance t between third group unit 2050 and fourth group unit 2060 is enlarged in the telephotographic state.

In view of this, in the present exemplary embodiment, reinforcing plate 2067 is disposed at a part of shutter flexible circuit 2066, as shown in FIG. 5. Reinforcing plate 2067 is made of material harder than shutter flexible circuit 2066. A portion of shutter flexible circuit 2066 at which reinforcing plate 2067 is disposed is restricted from being bent owing to reinforcing plate 2067. In FIG. 12C, shutter flexible circuit 2066 is restricted from being bent owing to reinforcing plate 2067, and therefore, shutter flexible circuit 2066 is bent on the rear side in the optical axis direction in comparison with OIS flexible circuit 2056.

Thus, the sag of shutter flexible circuit 2066 can be controlled, and consequently, shutter flexible circuit 2066 can be prevented from being hooked on other portions or being held between other frames.

With the above-described configuration, OIS flexible circuit 2056 and shutter flexible circuit 2066 can be prevented from being hooked on other portions or being held between other frames even in the case where an actuator is largely moved inside lens barrel 2000 in the optical axis direction or where two or more kinds of actuators are independently drawn.

Incidentally, although reinforcing plate 2067 is disposed at shutter flexible circuit 2066 so as to restrain the bending in the present exemplary embodiment, shutter flexible circuit 2066 may be partly widened to be hardly bent. The widened portion of shutter flexible circuit 2066 may be hooked on another frame to be restrained from being bent.

[5. Detailed Configuration of Drive Section for First Group Unit and Second Group Unit]

A description will be given below of the configuration of a drive section for first group unit 2030 and second group unit 2040.

[5-1. Configuration of Drive Section for First Group Unit and Second Group Unit]

Figure 13:
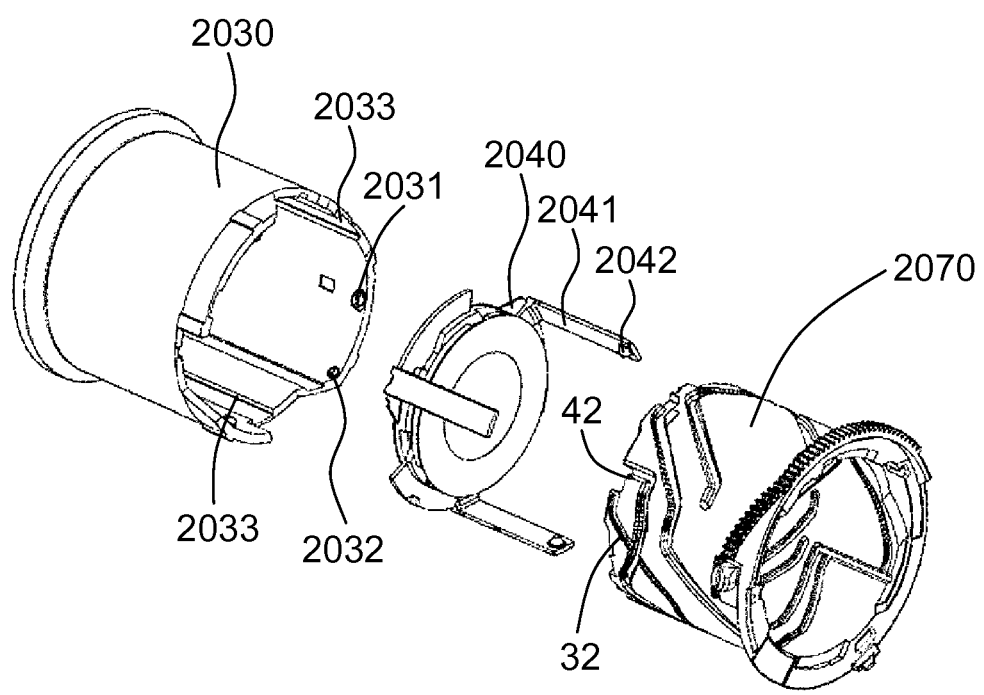
FIG. 13 is an exploded perspective view showing a first group unit, a second group unit, and the cam frame of the lens barrel in the exemplary embodiment.

FIG. 13 is an exploded perspective view showing the configuration of a drive section for first group unit 2030, second group unit 2040, and cam frame 2070.

In FIG. 13, first group unit 2030 has three main cam followers 2031 at the inner circumferential surface (only one is shown in FIG. 13). Moreover, first group unit 2030 has two auxiliary cam followers 2032 at the inner circumferential surface, each of auxiliary cam followers 2032 having a smaller cross-sectional area and a smaller radial projecting quantity than those of main cam follower 2031 (only one is shown in FIG. 13). In addition, first group unit 2030 has rotation restricting groove 2033 formed in the optical axis direction at the inner circumferential surface.

Second group unit 2040 has rotation restrictor 2041 extending from the outer peripheral surface rearward in the optical axis direction and cam follower 2042 inside in the vicinity of the rear end of rotation restrictor 2041. Rotation restrictor 2041 engages with rotation restricting groove 2033 of first group unit 2030. With this configuration, second group unit 2040 is not rotated relatively to first group unit 2030 but is movably held lengthwise in the optical axis direction.

Here, rotation restrictor 2041 of second group unit 2040 is formed such that the radial thickness of rotation restrictor 2041 is substantially the same as that of rotation restricting groove 2033 of first group unit 2030. With this configuration, rotation restrictor 2041 can be disposed in such a manner as to be contained within rotation restricting groove 2033 of first group unit 2030 without projecting from the inner surface of first group unit 2030 inward in the radial direction. Consequently, first group main cam groove 31 and first group auxiliary cam groove 32 for first group unit 2030 and second group cam groove 42 for second group unit 2040 can be simultaneously disposed at the outer peripheral surface of cam frame 2070 in lens barrel 2000 without any increase in radial thickness.

FIGS. 14A to 14C are views for explaining first group main cam groove 31, first group auxiliary cam groove 32, and second group cam groove 42 in cam frame 2070. Here, FIG. 14A is a developed view showing the outer peripheral surface of cam frame 2070; FIG. 14B is a cross-sectional view showing first group auxiliary cam groove 32; and FIG. 14C is a cross-sectional view showing second group cam groove 42.

In FIG. 14A, eight cam grooves in total are formed at the outer peripheral surface of cam frame 2070, that is, three first group main cam grooves 31, two first group auxiliary cam groove 32, and three second group cam grooves 42.

First group main cam groove 31 slidably holds main cam follower 2031 of first group unit 2030. First group auxiliary cam groove 32 slidably holds auxiliary cam follower 2032 of first group unit 2030. Second group cam groove 42 slidably holds cam follower 2042 of second group unit 2040.

In FIG. 14A, first group auxiliary cam groove 32 and second group cam groove 42 partly overlap each other.

In FIGS. 14B and 14C, second group cam groove 42 is formed more deeply than first group auxiliary cam groove 32, so that cam follower 2042 remains slidably held at a deep portion of second group cam groove 42.

Here, first group unit 2030 is exposed to the outside of digital camera 3000. Therefore, when digital camera 3000 drops, a remarkably large external force is exerted on first group unit 2030.

On the other hand, second group unit 2040 is contained within lens barrel 2000, and therefore, a smaller force is exerted on second group unit 2040 than first group unit 2030.

As shown in FIG. 14A, first group main cam groove 31 is formed in such a manner as not to cross (interfere) other cam grooves. As a consequence, main cam follower 2031 is slidably held by first group main cam groove 31 all the time. In the meantime, first group auxiliary cam groove 32 is formed in such a manner as to partly cross second group cam groove 42. Here, when auxiliary cam follower 2032 is located at the crossing position, auxiliary cam follower 2032 does not slide inside first group auxiliary cam groove 32. In view of this, lens barrel 2000 is designed such that positions P, Q, and R at which first group auxiliary cam groove 32 and second group cam groove 42 cross each other are not located on the same plane perpendicular to optical axis AX. With this configuration, in first group unit 2030, the four or more cam grooves in total, that is, the three first group main cam grooves 31 and at least one of two first group auxiliary cam grooves 32, engage with each other. This configuration can achieve a greater strength than the case where only three first group main cam grooves 31 engage. For example, when one of auxiliary cam followers 2032 does not slide inside first group auxiliary cam groove 32 at the position P, the other auxiliary cam follower 2032 is not located at the position Q or R. Therefore, at least one of auxiliary cam followers 2032 is slidably held in first group auxiliary cam groove 32.

Although the slide surface of cam follower 2042 becomes shallow at a portion at which second group cam groove 42 crosses first group auxiliary cam groove 32, only a small force is exerted on second group unit 2040 in comparison with first group unit 2030, and therefore, they hardly slip off.

As described above, the cam grooves for first group unit 2030 and second group unit 2040 are formed at the outer periphery surface of cam frame 2070, thereby driving first group unit 2030 and second group unit 2040 without increasing the diameter of lens barrel 2000. Moreover, more cam grooves can be formed at the inner circumferential surface of cam frame 2070 in comparison with the case where cam groove 42 for second group unit 2040 is formed at the inner circumferential surface of cam frame 2070, thereby increasing the degree of freedom for forming the cam grooves at the inner circumferential surface of cam frame 2070. With this configuration, lens barrel 2000 enables more units to be independently driven or more cam grooves to be formed in the optical axis direction according to the limited dimension, so as to reduce the dimension of lens barrel 2000 in the optical axis direction.

Moreover, the formation of first group auxiliary cam groove 32 and the slide of auxiliary cam follower 2032 can enhance the strength of first group unit 2030 in lens barrel 2000.

[6. Dustproof Configuration of Image Pickup Element Fixing Unit]

A description will be given below of the dustproof configuration of an image pickup element fixing unit with reference to FIGS. 15 and 16.

Figure 15:
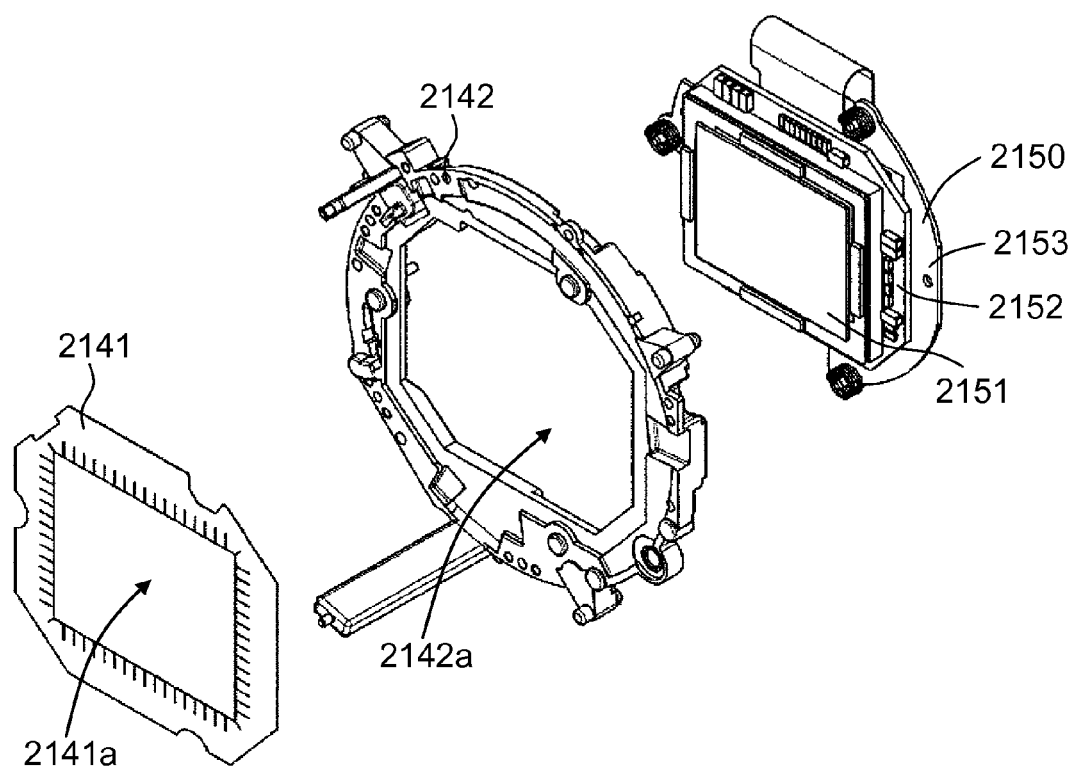
FIG. 15 is an exploded perspective view showing a master flange unit and an image pickup element unit in the exemplary embodiment.

FIG. 15 is an exploded perspective view showing master flange unit 2140 and image pickup element unit 2150.

In FIG. 15, master flange unit 2140 has master flange 2142 and dustproof sheet 2141.

Master flange 2142 has a larger opening 2142a formed thereat than image pickup element 2151.

Dustproof sheet 2141 having opening 2141a formed in substantially the same size as image pickup element 2151 is stuck to the inner diameter portion of master flange 2142.

Dustproof sheet 2141 is formed by punching a light-shielding resin thin plate. A plurality of slits are formed around opening 2141a.

Figure 16:
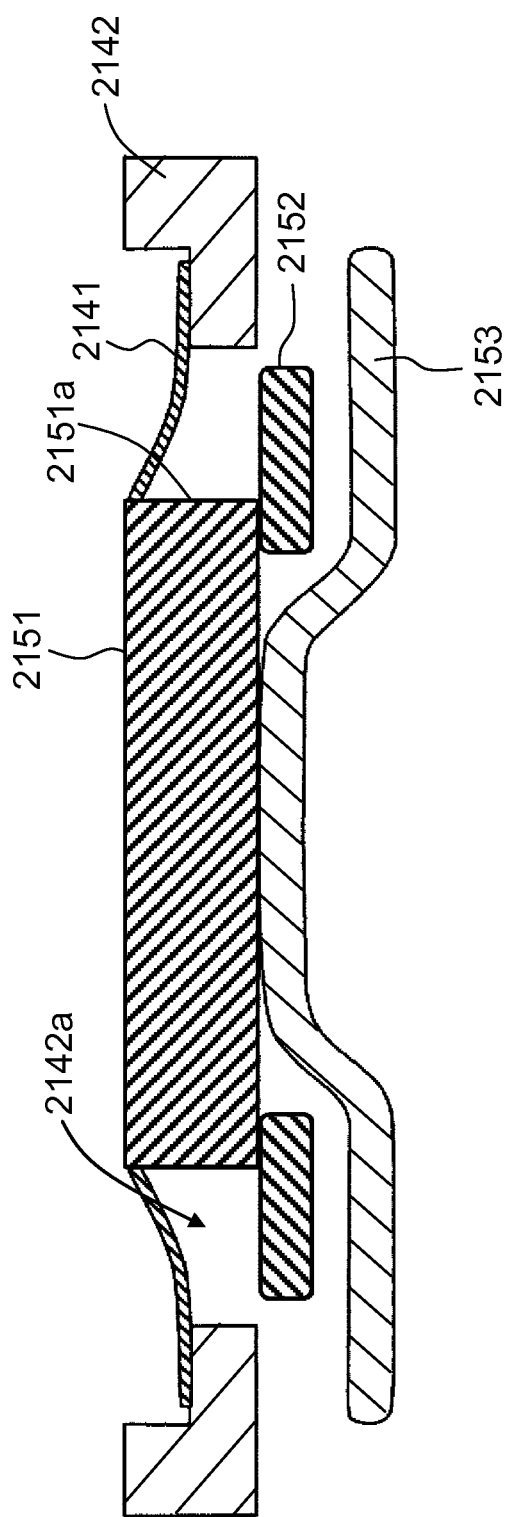
FIG. 16 is a cross-sectional view schematically showing essential parts of the master flange unit and the image pickup element unit in the exemplary embodiment.

FIG. 16 is a view schematically showing a cross section when master flange unit 2140 and image pickup element unit 2150 are combined with each other.

Opening 2141a of dustproof sheet 2141 is formed to be slightly smaller than image pickup element 2151. Therefore, the edge of opening 2141a abuts against the outer peripheral portion of image pickup element 2151. With this configuration, the outer peripheral portion of image pickup element 2151 remains pressed against dustproof sheet 2141.

With this configuration, dustproof sheet 2141 shields a clearance inside the barrel and a clearance outside image pickup element 2151, thus making it difficult for foreign matter such as dust or dirt to enter the inside of the barrel. In addition, extra light can be prevented from intruding from the surroundings of image pickup element 2151 and from being reflected on an image.

[7. Other Exemplary Embodiments]

As described above, the technique disclosed in the present application is exemplified by the exemplary embodiment. However, the technique of this disclosure is not limited to this, and it is applicable to exemplary embodiments that are subjected to modification, replacement, addition, or omission. Moreover, the constituent elements described by way of the above-described exemplary embodiment may be combined to make a new exemplary embodiment.

Other exemplary embodiments will be illustrated below.

In the exemplary embodiment, thin portions 2052 for connecting cam follower base 2053 and main body 2057 of third group unit 2050 to each other are disposed at the positions apart from each other in the circumferential direction on optical axis AX. However, this disclosure is not limited to this. They may be disposed at positions apart from each other in the direction along optical axis AX.

Moreover, in the exemplary embodiment, two thin portions 2052 are provided. However, this disclosure is not limited to this. The number of thin portions is arbitrary.

Furthermore, in the exemplary embodiment, cam follower 2051 is disposed outside in the radial direction of cam follower base 2053. However, this disclosure is not limited to this. A cam follower may be disposed inside in the radial direction of the cam follower base, and furthermore, a cam groove may be formed inside thereof.

In addition, in the exemplary embodiment, the leaf spring is adapted to urge cam follower base 2053. However, this disclosure is not limited to this. A cam follower base per se may be urged outside, or another urging member such as a torsion coil spring may be used.

Additionally, in the exemplary embodiment, aligning hole 2055 is formed at third group unit 2050, and furthermore, cutaway portion 2071 is formed at cam frame 2070. However, this disclosure is not limited to this. An aligning hole or a cutaway portion may be appropriately switched or only aligning holes or cutaway portions may be used.

Moreover, in the exemplary embodiment, when third group unit 2050 is most moved to the drawing position with respect to cam frame 2070, aligning hole 2055 and cutaway portion 2071 face each other, thereby forming one through hole. However, this disclosure is not limited to this. An aligning hole or a cutaway portion may face each other on the way at a zoom section, thereby forming one through hole.

[Supplement 1]

A lens barrel (e.g., lens barrel 2000) including:

a first movement group (e.g., third lens group G3);

a second movement group (e.g., fourth lens group G4) that is different from the first movement group and includes at least one lens;

a first frame (e.g., third group unit 2050) that holds the first movement group;

a second frame (e.g., fourth group unit 2060) that is disposed inside the first frame and holds a lens in the second movement group; and a third frame (e.g., cam frame 2070) that is disposed outside the first frame and holds the first frame in a manner movable in an optical axis direction, wherein the first frame has at least one hole (e.g., aligning hole 2055) at the outer peripheral surface, the third frame has at least one hole or cutaway portion (e.g., cutaway portion 2071) at the outer peripheral surface, and when the first frame is driven up to a predetermined position within a drivable range with respect to the third frame, the hole formed at the first frame faces the hole or cutaway portion formed at the third frame.

[Supplement 2]

A lens barrel that holds at least one lens (e.g., lens barrel 2000) including:

a fixing frame (e.g., fixed frame unit 2010);

a drive frame (e.g., third group unit 2050 or fourth group unit 2060) that is movable in an optical axis direction with respect to the fixing frame;

a moving unit that is moved according to the movement of the drive frame and is provided with an electric constituent element;

a flexible circuit (e.g., OIS flexible circuit 2056 or shutter flexible circuit 2066) that has a first end connected to the moving unit; and an FPC guide frame (e.g., FPC guide frame 2080) that is moved in the optical axis direction independently of the moving unit and is adapted to guide the flexible circuit.

[Supplement 3]

A lens barrel that holds at least one lens (e.g., lens barrel 2000) including:

a fixing frame (e.g., fixed frame unit 2010);

a first and a second moving units that are movable in an optical axis direction with respect to the fixing frame and are provided with an electric constituent element;

a first flexible circuit (e.g., OIS flexible circuit 2056) that has a first end connected to the first moving unit and a second end connected to the fixing frame; and a second flexible circuit (e.g., shutter flexible circuit 2066) that has a first end connected to the second moving unit and a second end connected to the first flexible circuit at the same position in the fixing frame, wherein the second flexible circuit is provided with a bend restrictor (e.g., reinforcing plate 2067) that restricts bend in a partly region of the second flexible circuit.

[Supplement 4]

A lens barrel including:

a first frame (e.g., cam frame 2070) that is formed into a substantially cylindrical shape;

a first lens group (e.g., first lens group G1) and a second lens group (e.g., second lens group G2), each of the lens groups having at least one lens and being movable in an optical axis direction in sequence from a subject to an image; and a second frame (e.g., first group unit 2030) and a third frame (e.g., second group unit 2040) that hold the first lens group and the second lens group, respectively, wherein the second frame has a first cam follower (e.g., main cam follower 2031) that can engage with the first frame and a second cam follower (e.g., auxiliary cam follower 2032), and the third frame has a third cam follower (e.g., cam follower 2042) that can engage with the first frame, and the first frame has, at the outer peripheral surface, a first cam groove (e.g., first group main cam groove 31) and a third cam groove (e.g., second group cam groove 42) that can engage with the first cam follower and the third cam follower in such a manner as not to interfere each other, and simultaneously, a second cam groove (e.g., first group auxiliary cam groove 32) that can engage with the second cam follower, the second cam groove and the third cam groove partly crossing each other.

[Supplement 5]

An image pickup device including:

a master flange (e.g., master flange 2142) having a first opening on an optical axis;

a dustproof sheet (e.g., dustproof sheet 2141) that is held in the master flange and has a second opening (e.g., opening 2141*a*) smaller than the first opening (e.g., opening 2142*a*); and an image pickup element (e.g., image pickup element 2151) that is disposed at the second opening, wherein the dustproof sheet has an edge of the second opening that abuts against the outer peripheral portion of the image pickup element.

This disclosure is applicable to a lens barrel provided with an optical system, and a digital camera, a mobile telephone, a smart telephone, and the like that use the lens barrel.

What is claimed is:

1. A lens barrel in which a lens can be moved in a direction parallel to an optical axis, the lens barrel comprising:

a first frame having a cam follower and a cam follower base that holds the cam follower; and a second frame that has a cam groove engageable with the cam follower, wherein the first frame and the second frame are moved relatively to each other along the optical axis, the cam follower base has a first end connected to a main body of the first frame via at least one thin portion, and a second end not connected to the main body, the thin portion is formed such that a thickness of the thin portion in a radial direction of the lens barrel is smaller than that of the cam follower base, and the main body of the first frame has a restricting projection at a position opposite to the cam follower base and on a side opposite to the cam follower with the cam follower base being held between the restricting projection and the cam follower.

2. The lens barrel according to claim 1, wherein the cam follower base is connected to the first frame via the plurality of thin portions disposed apart from each other.

3. A lens barrel in which a lens can be moved in a direction parallel to an optical axis, the lens barrel comprising:

a first frame having a cam follower and a cam follower base that holds the cam follower;

a second frame that has a cam groove engageable with the cam follower;

an urging member at a position opposite to the cam follower base; and a third frame that is held at a position opposite to the cam follower base, wherein the first frame and the second frame are moved relatively to each other along the optical axis, the cam follower base has a first end connected to a main body of the first frame via at least one thin portion, and a second end not connected to the main body, the thin portion is formed such that a thickness of the thin portion in a radial direction of the lens barrel is smaller than that of the cam follower base, the urging member urges the cam follower toward the cam groove, and the urging member is held by the third frame.

4. The lens barrel according to claim 1, wherein the thin portion is formed such that a length of the thin portion in a direction parallel to an optical axis is shorter than that of the cam follower base.

5. The lens barrel according to claim 2, wherein the thin portion is formed such that a length of the thin portion in a direction parallel to an optical axis is shorter than that of the cam follower base.

6. The lens barrel according to claim 3, wherein the cam follower base is connected to the first frame via the plurality of thin portions disposed apart from each other.

7. The lens barrel according to claim 6, wherein the thin portion is formed such that a length of the thin portion in a direction parallel to an optical axis is shorter than that of the cam follower base.

8. The lens barrel according to claim 3, wherein the thin portion is formed such that a length of the thin portion in a direction parallel to an optical axis is shorter than that of the cam follower base.

* * * * *